United States Patent
Schlenker

(10) Patent No.: US 10,808,885 B2
(45) Date of Patent: Oct. 20, 2020

(54) LUBRICANT PRESS, LUBRICANT PRESS KIT, AND USE OF A CARTRIDGE IN CASE OF A LUBRICANT PRESS

(71) Applicant: Pressol—Schmiergeräte Gesellschaft mit beschränkter Haftung, Umkirch (DE)

(72) Inventor: Rudolf Schlenker, Immensee (CH)

(73) Assignee: Pressol—Schmiegeräte Gesellschaft mit beschränkter Haftung, Umkirch (DE)

( * ) Notice: Subject to any disclaimer, the term of this patent is extended or adjusted under 35 U.S.C. 154(b) by 86 days.

(21) Appl. No.: 16/064,684

(22) PCT Filed: Dec. 22, 2016

(86) PCT No.: PCT/EP2016/002158
§ 371 (c)(1),
(2) Date: Oct. 17, 2018

(87) PCT Pub. No.: WO2017/108185
PCT Pub. Date: Jun. 29, 2017

(65) Prior Publication Data
US 2019/0032846 A1    Jan. 31, 2019

(30) Foreign Application Priority Data
Dec. 23, 2015   (DE) .......................... 10 2015 016 821

(51) Int. Cl.
*F16N 3/00*   (2006.01)
*F16N 3/12*   (2006.01)
*F16N 13/08*  (2006.01)
*F16N 19/00*  (2006.01)
*F16N 23/00*  (2006.01)

(52) U.S. Cl.
CPC ................. *F16N 3/00* (2013.01); *F16N 3/12* (2013.01); *F16N 13/08* (2013.01); *F16N 19/00* (2013.01); *F16N 23/00* (2013.01)

(58) Field of Classification Search
CPC ... F16N 3/00; F16N 3/12; F16N 13/08; F16N 19/00; F16N 23/00
USPC ....................................................... 222/256
See application file for complete search history.

(56) References Cited

U.S. PATENT DOCUMENTS

| | | | | |
|---|---|---|---|---|
| 1,721,817 A | * | 7/1929 | Goodman | F16N 3/12 222/256 |
| 1,723,269 A | * | 8/1929 | Davis | F16N 3/10 222/254 |
| 1,981,508 A | * | 11/1934 | Harris | F16N 3/12 222/256 |
| 2,384,824 A | * | 9/1945 | Eitner | F16N 3/12 222/260 |

(Continued)

FOREIGN PATENT DOCUMENTS

| CN | 2204367 | 8/1995 |
|---|---|---|
| CN | 203131388 | 8/2013 |

(Continued)

*Primary Examiner* — Patrick M. Buechner
*Assistant Examiner* — Michael J. Melaragno
(74) *Attorney, Agent, or Firm* — Volpe and Koenig, P.C.

(57) ABSTRACT

For a lubricant press (1), a follower piston (13) is proposed that can be inserted into a cartridge (4) and is matched to a closing wall (6) of a cartridge holder (3), such that the follower piston (13) in the used-up cartridge (4) lies against the closing wall (6) in a planar manner.

16 Claims, 2 Drawing Sheets

(56) References Cited

U.S. PATENT DOCUMENTS

| | | | | |
|---|---|---|---|---|
| 2,425,867 A * | 8/1947 | Davis | F16N 3/12 | 222/231 |
| 2,470,386 A * | 5/1949 | Abbrecht | F16N 13/22 | 184/35 |
| 2,477,726 A * | 8/1949 | Davis | F16N 3/12 | 222/256 |
| 2,497,762 A * | 2/1950 | Davis | F16N 3/12 | 74/104 |
| 2,833,449 A * | 5/1958 | Morton | F16N 13/08 | 222/256 |
| 2,844,287 A * | 7/1958 | Brandt | F16N 3/12 | 222/326 |
| 2,872,085 A * | 2/1959 | Mueller | F02M 37/103 | 222/376 |
| 2,886,215 A * | 5/1959 | Klein | F16N 3/12 | 222/256 |
| 2,899,112 A * | 8/1959 | Morton | F16N 3/12 | 222/325 |
| 2,915,226 A * | 12/1959 | Sundholm | F16N 3/12 | 222/340 |
| 2,923,443 A * | 2/1960 | Sundholm | F16N 3/12 | 222/380 |
| 2,941,854 A * | 6/1960 | Jernander | F16N 3/12 | 92/130 R |
| 2,978,151 A * | 4/1961 | Sundholm | F16N 3/12 | 222/386.5 |
| 3,007,621 A * | 11/1961 | Galbierz | F16N 3/12 | 229/5.6 |
| 3,033,424 A * | 5/1962 | Gronvik | F16N 3/12 | 222/256 |
| 3,038,768 A * | 6/1962 | Kludt | F16N 3/12 | 277/439 |
| 3,059,819 A * | 10/1962 | Sundhohn | F16N 3/12 | 222/326 |
| 3,174,657 A * | 3/1965 | Sundholm | F16N 3/12 | 222/326 |
| 3,178,059 A * | 4/1965 | Packwood, Jr. | A47K 5/1211 | 222/45 |
| 3,178,074 A * | 4/1965 | Sundholm | F16N 3/12 | 222/386 |
| 3,180,533 A * | 4/1965 | Sundholm | F16N 3/12 | 222/256 |
| 3,187,959 A * | 6/1965 | Morehouse | F16N 3/12 | 222/256 |
| 3,209,955 A * | 10/1965 | Sundholm | F16N 3/12 | 222/256 |
| 3,316,853 A * | 5/1967 | Schneller | F04B 9/14 | 417/435 |
| 3,393,840 A * | 7/1968 | Sundholm | F16N 3/12 | 222/324 |
| 3,414,170 A * | 12/1968 | Sundholm | F16N 3/12 | 222/340 |
| 3,653,555 A * | 4/1972 | Dorn | F16N 3/12 | 222/256 |
| 3,752,367 A * | 8/1973 | Sundholm | F04B 53/14 | 222/256 |
| 3,780,830 A * | 12/1973 | Helgerud | F16N 3/12 | 184/105.2 |
| 4,077,493 A * | 3/1978 | Spaude | F16N 3/12 | 184/105.2 |
| 4,077,494 A * | 3/1978 | Spaude | F16N 3/12 | 184/105.2 |
| 4,083,428 A * | 4/1978 | Ness | F16J 1/008 | 184/105.2 |
| 4,168,787 A | 9/1979 | Stamper | | |
| 4,219,131 A * | 8/1980 | Funderburgh | F16N 3/12 | 222/1 |
| 4,247,023 A * | 1/1981 | Shew | F16N 3/12 | 222/386 |
| 4,298,144 A * | 11/1981 | Pressl | F16N 3/12 | 184/105.2 |
| 4,560,095 A * | 12/1985 | Shew | F16N 3/12 | 222/256 |
| 4,601,412 A * | 7/1986 | Martin | F16N 3/12 | 222/256 |
| 4,664,298 A | 5/1987 | Shew | | |
| 4,676,409 A * | 6/1987 | Stolz | F16N 3/12 | 184/105.1 |
| 5,199,614 A * | 4/1993 | Husman | B05B 11/02 | 222/256 |
| 5,248,069 A * | 9/1993 | Consaga | B67D 7/0227 | 222/386 |
| 5,323,934 A * | 6/1994 | Isert | F16N 3/12 | 222/326 |
| 5,404,967 A * | 4/1995 | Barry | F16N 3/12 | 184/105.1 |
| 5,779,105 A * | 7/1998 | Brown | F16N 3/12 | 222/262 |
| 5,826,753 A * | 10/1998 | Fehlig | F16N 3/12 | 222/153.13 |
| 5,918,702 A * | 7/1999 | Cheng | B05C 17/00569 | 184/105.2 |
| 6,149,037 A * | 11/2000 | Berrend | F16N 7/00 | 184/38.1 |
| 6,253,810 B1 * | 7/2001 | Trigiani | F16N 37/02 | 141/382 |
| 6,467,579 B1 * | 10/2002 | Simon | F16N 3/12 | 184/105.2 |
| 8,162,184 B2 * | 4/2012 | He | F16N 3/12 | 222/256 |
| 8,235,253 B2 * | 8/2012 | Shew | F16N 3/12 | 222/256 |
| 8,297,476 B2 * | 10/2012 | Weems | F16N 3/12 | 184/105.2 |
| 8,517,224 B2 * | 8/2013 | Kuo | F16N 13/08 | 184/105.2 |
| 9,297,498 B1 * | 3/2016 | Kuntzelman | F16N 3/12 | |
| 9,739,417 B2 * | 8/2017 | Maser | F16N 3/12 | |
| 2004/0074927 A1 * | 4/2004 | Lafond | B05C 17/00503 | 222/327 |
| 2004/0084482 A1 * | 5/2004 | Sumner | F16N 3/00 | 222/387 |
| 2007/0210108 A1 * | 9/2007 | Cline | F16N 3/12 | 222/154 |
| 2008/0029549 A1 * | 2/2008 | Hulden | F16N 3/12 | 222/256 |
| 2010/0116850 A1 * | 5/2010 | Weems | F16N 3/12 | 222/256 |
| 2010/0147893 A1 * | 6/2010 | Shew | F16N 3/12 | 222/256 |
| 2010/0294808 A1 * | 11/2010 | He | F16N 3/12 | 222/256 |
| 2012/0031929 A1 * | 2/2012 | Guo | F16N 3/12 | 222/323 |
| 2012/0241479 A1 * | 9/2012 | Kuo | F16N 3/12 | 222/256 |
| 2013/0087584 A1 * | 4/2013 | Guo | F16N 3/12 | 222/323 |
| 2014/0061242 A1 * | 3/2014 | Kuo | G01F 11/00 | 222/156 |
| 2016/0076698 A1 * | 3/2016 | Maser | F16N 3/12 | 222/326 |

FOREIGN PATENT DOCUMENTS

| | | | |
|---|---|---|---|
| DE | 202012103334 | 1/2014 | |
| DE | 20 2013 102 560 | * 10/2014 | F16N 3/12 |
| DE | 202013102560 | 10/2014 | |
| GB | 1316077 | 5/1973 | |
| RU | 2244202 | 1/2005 | |
| SU | 93347 | 1/1952 | |
| SU | 118466 | 1/1958 | |

* cited by examiner

LUBRICANT PRESS, LUBRICANT PRESS KIT, AND USE OF A CARTRIDGE IN CASE OF A LUBRICANT PRESS

BACKGROUND

The invention concerns a lubricant press with a press head, exhibiting a cartridge receptacle and with the cartridge receptacle being provided with a closing wall, which is connected to a high-pressure chamber by a passage and with that high-pressure chamber containing a pressing plunger that is mounted in such a way as to be movable and is operatively connected to the press head with a hand lever mounted on the press head and with the high-pressure chamber leading into an outlet opening and with a follower piston that can be inserted into a cartridge.

The invention further concerns a lubricant press set with a lubricant press, in particular as described, and including a cartridge, wherein the cartridge comprises a cartridge sleeve surrounding a filling volume and wherein the follower piston of the lubricant press is movably inserted into the cartridge sleeve to seal off the filling volume.

Finally, the invention concerns a use of a cartridge by a lubricant press.

Lubricant presses are known and used, for example, to supply lubricants from a cartridge to potentially difficult to access locations.

SUMMARY

The invention is intended to improve the performance characteristics of such a lubricant press.

The features as described in connection with the invention are intended to provide this improvement. In particular, it is provided for a lubricant press of the type in accordance with the invention as described above that a top side of the follower piston facing the closing wall in operating position exhibits contours, which are formed to match the contours of the closing wall so that the follower piston can come into planar contact with at least a partial area on the closing wall on its top side. This is advantageous because the remaining dead volume can be designed to be as small as possible. In particular, residues that have up to that point formed in cavities between the press head and the follower piston in its end position can thereby be avoided. Even standard cartridges can thus be used to save on lubricants, which exhibit no special configuration on their top sides for a specific press head and in particular no screw connection for a passage.

In an advantageous embodiment an inlet opening of the passage can be provided at a position furthest inside the press head of the closing wall in the cartridge insertion direction as defined by the cartridge receptacle. Thus, the formation of lubricant residues in the cartridge receptacle, for example in pockets, can be avoided.

In an advantageous embodiment a closing wall that is planar at least in the partial area can be provided. Thus, obstructions that might lead to the accumulation of lubricant residues can be avoided in the partial area. A planar closing wall is particularly advantageous. This allows the inlet opening to be easily arranged at a highest point in the insertion or supply direction. Alternatively or additionally a planar top side can be provided. A dead volume at the top, where lubricant residues might accumulate, can thus be prevented. It is particularly advantageous if the partial area and the surface are matched to one another in their planar shape. It is thus possible to simply place the surface into contact with the partial area in a planar manner to completely displace all of the lubricant.

In an advantageous embodiment the passage inside the closing wall can at least partially be arranged outside of the partial area. This is advantageous because the passage can be arranged behind a remaining dead volume inside the cartridge receptacle. With this it can be achieved that lubricant in this dead volume can at least partially be replaced after inserting a new cartridge. It is further advantageous to arrange the passage laterally in relation to a cartridge receptacle preferably centered in the partial area, which enables a longer stroke for the pressing plunger without having to extend the external dimensions.

In an advantageous embodiment the follower piston can be provided with a circumferential shoulder around the top side. This is advantageous because the follower piston can be designed in such a way that the top side may reach through a removal opening of a cartridge. This means that the dead volume, meaning the volume remaining with a used up cartridge, where the follower piston reaches its final position, can be reduced in the cartridge receptacle.

This is particularly advantageous if the shoulder exhibits a ring-shaped shoulder surface. The shoulder surface can be arranged in parallel to the top side. As such the follower piston can be designed to match the shape of a removal opening of a standard cartridge, where the removal opening is formed by a circumferential shroud projecting inward from the cartridge sleeve.

In an advantageous embodiment the follower piston can be designed to be without interruptions. Thus, guide rods are not necessary and the follower piston can be designed to be easily sealed.

In an advantageous embodiment the follower piston can be provided with a circumferential sealing lip. Thus, a ring slot between the follower piston and the cartridge sleeve is sealable.

In an advantageous embodiment an internal thread can be provided on the cartridge receptacle. Thus, a cartridge can be fixed to the cartridge receptacle in an easily removable manner.

In an advantageous embodiment a receiver tube screwed into the cartridge receptacle can be provided, which is open on one free end. Thus, a standard cartridge exhibiting a circumferential collar on its outer surface can be mounted in the cartridge receptacle in an easily removable manner. Forming of a thread on the cartridge is not necessary. The receiver tube offers mechanical protection, for example by being longer than the cartridge. The open design on the lower free end allows the receiver tube to easily let in air to compensate as the follower piston moves in operation.

A sealing ring can be inserted into the cartridge receptacle for sealing purposes, where the cartridge sleeve comes into contact with the closing wall.

In an advantageous embodiment a check valve can be provided in the passage. This is advantageous because the backflow of lubricant into the cartridge receptacle can thus be prevented.

In an advantageous embodiment a plunger pump downstream of the passage can be provided. This allows for the removal of lubricant even if the follower piston is unloaded. The plunger pump is preferably equipped with a hand lever that can be used to manually actuate the pressing plunger.

In order to provide a solution for the stated objective of possibly separate inventive nature, these features are provided to be combined into a lubricant press set in accordance with the invention. In particular, a lubricant press set of the type described above to provide a solution for the stated objective in accordance with the invention is provided, which exhibits a shape of the follower piston that is matched to the cartridge in such a manner that the filling volume of the cartridge sleeve can be fully emptied by the follower piston without leaving any residue. This is advantageous because the accumulation of non-removable lubricant residue in the used up cartridge can be prevented by simple means. This increases the yield of the cartridge and thereby improves the operating properties of the lubricant press.

In an advantageous embodiment a filling volume of the cartridge sleeve limited by a constricting removal opening and an outer diameter of the top side of the follower piston matched to the inner diameter of the removal opening can be provided. The removal opening is preferably closed before initial use and will only be opened shortly prior to initial use, for example by tearing off a cap or closure. This is advantageous because the follower piston can be designed to have a large-scale top side, in order to cover a partial area of the closing wall that is as large as possible. Dead volume can thus be restricted to a small space.

In an advantageous embodiment the height of the circumferential shoulder around the top side, for example of the top side mentioned above, of the follower piston can be matched to the projection of the cartridge sleeve beyond the removal opening. The follower piston can thus easily come into planar contact with the partial area, in its end position. In this regard, the height can be chosen to be greater than the projection, in order to provide space for a seal.

In an advantageous embodiment a ring-shaped shoulder surface of a shoulder surrounding the top side, in particular the top side mentioned above, can be matched to a ring-shaped inner surface located between the removal opening and the cartridge sleeve. It can thus easily be prevented that residue remains on the constriction inside the used up cartridge.

In an advantageous embodiment the follower piston can be arranged to be unloaded inside the cartridge sleeve. The follower piston is thus moved inside the cartridge sleeve solely due to negative pressure applied to the cartridge receptacle through the passage. A seal between cartridge sleeve and follower piston can thus be provided easily. The follower piston can alternatively or additionally be arranged inside the cartridge sleeve unconnected to the press head. Therefore additional moving parts used to actuate the follower piston externally can be omitted. The follower piston can alternatively or additionally be arranged to be removable from the cartridge sleeve. This is advantageous because the follower piston would be reusable.

In order to provide a solution for the stated problem in accordance with the invention when using a cartridge with a lubricant press in accordance with the invention, in particular as described above and/or in accordance with one of the claims for the lubricant press, it is provided that the cartridge be opened to the top and that prior to removal of lubricant from the cartridge, the follower piston of the lubricant press is inserted into the cartridge on the underside in order to seal the filling volume inside the cartridge and to ensure that after complete emptying of the cartridge, the follower piston comes into planar contact with the partial area on its top side. This is advantageous because the cartridge can be completely emptied in a simple manner. The follower piston can here be inserted into the cartridge receptacle before or after inserting the cartridge.

BRIEF DESCRIPTION OF THE DRAWINGS

The invention will now be described in greater detail using one possible embodiment, though it is not limited in nature to the embodiment described herein. Additional embodiments result from the combination of features of individual or multiple protection claims in relation to one another and/or in combination with other features of the embodiment.

The provided figures show the following.

DETAILED DESCRIPTION

Figure 1:
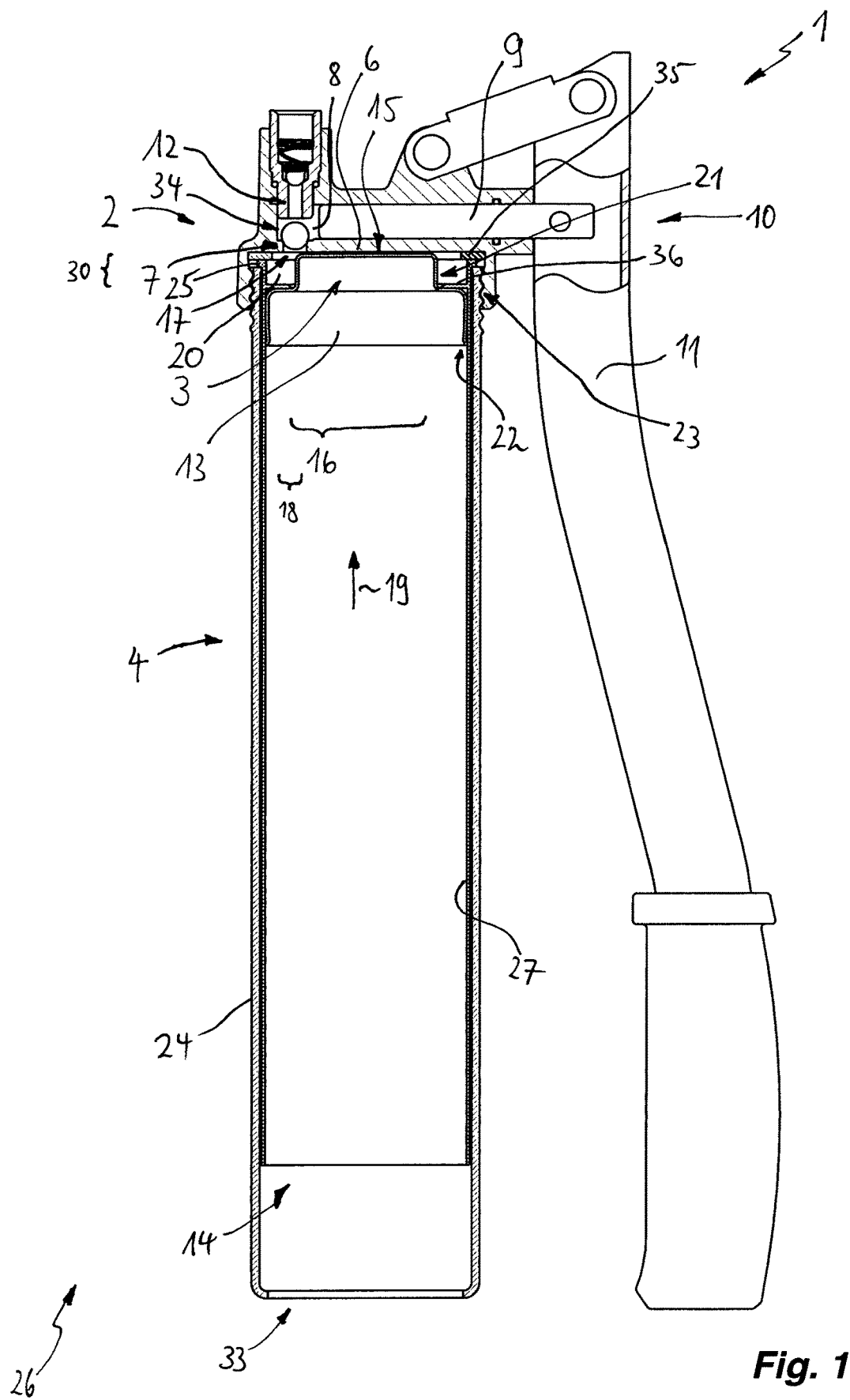
FIG. 1 is a sectional view of a lubricant press in accordance with the invention with inserted, filled cartridge starting from the beginning of the lubricant application from the cartridge, with the follower piston being arranged in its initial position.
Figure 2:
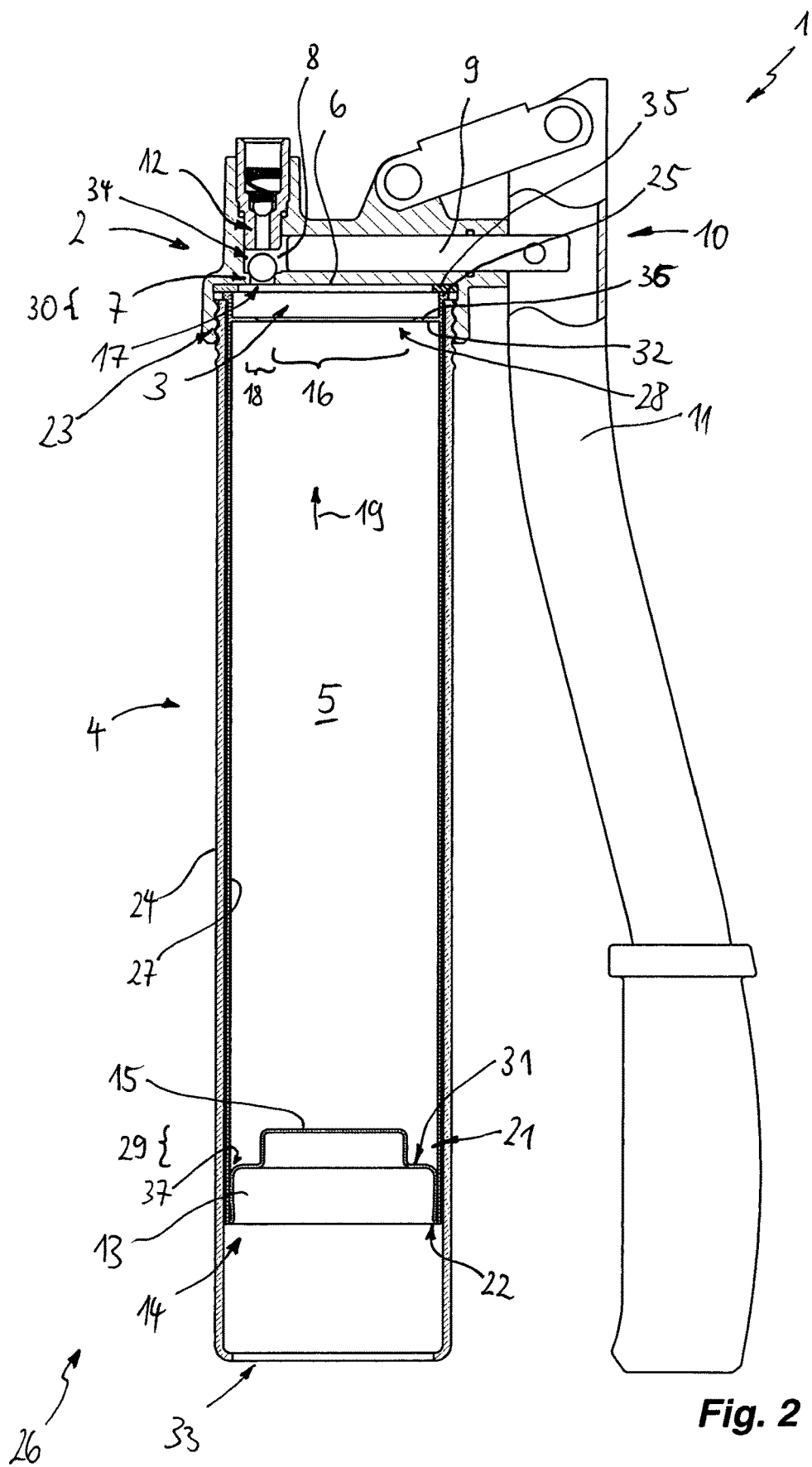
FIG. 2 is a sectional view, analogous to FIG. 1, wherein the cartridge is used up and the follower piston is located in its end position.

A lubricant press 1 shown in FIG. 1 and FIG. 2 is equipped with a press head 2. A cartridge receptacle 3 is formed on the press head 2, into which a cartridge 4 can be inserted. FIG. 1 shows the cartridge 4 in a state where a filling volume 5 is filled with lubricant while FIG. 2 shows a used up and fully emptied cartridge 4.

A closing wall 6 is provided in the cartridge receptacle 3. The closing wall 6 has a passage 7, which leads into a high-pressure chamber 8.

The high-pressure chamber 8 contains a pressing plunger 9 of a plunger pump 10, which can be moved inside the high-pressure chamber 8 using a hand lever 11 from the outside. The high-pressure chamber 8 has an outlet opening 12 through which lubricant exits from the filling volume 5.

The lubricant press 4 further comprises a follower piston 13, which can be inserted into an open end 14, with its top side 15 facing the front.

The top side 15 therefore faces the closing wall 6 in the operating position and exhibits contours that match the contours of the closing wall 6. Thereby the follower piston 13 rests in a planar manner with its top side 15 in a partial area 16 on the closing wall 6, when the cartridge 4 is used up (FIG. 2). Therefore no lubricant residue remains in this partial area 16.

The passage 7 is arranged in such a manner that an inlet opening 17 of the passage 7 is provided in the position 18 of the closing wall 6 furthest inside the press head. The inlet opening 19 is therefore located in the rearmost position in the cartridge insertion direction 19, defined by the cartridge receptacle 3, in the embodiment together with additional positions on closing wall 6. Therefore no pockets are present where lubricant residue might accumulate.

The closing wall 6 is designed to be planar fitting to the top side 15.

The passage 7 is provided partially outside the partial area 15 directly ahead of the remaining dead volume 20 in the cartridge receptacle 3. After replacing the used up cartridge 4 with a new one, this dead volume 20 will therefore, at least partially, be removed first. The lateral arrangement of the passage 7 also provides sufficient space for the arrangement of the oblong high-pressure chamber 8 within the press head 2.

A shoulder 21 is provided on the follower piston 13, which surrounds the top side 15 and confines the top side 16.

The shoulder 21 thereby forms a shoulder surface 31, which exhibits a ring shape and is aligned in parallel to the top side 15. This shape is matched to the cartridge 4 as will be explained in more detail.

The follower piston 13 is designed without interruptions and without a guide rod being positioned inside the cartridge 4 and exhibits a circumferential sealing lip 22 in a ring shape. The sealing lip 22 thereby seals a ring slot 37 between the follower piston 13 and a cartridge sleeve 27.

An internal thread 23 is provided on the cartridge receptacle 3, on which a receiver tube 24 is screwed into the cartridge receptacle 3 in order to hold the cartridge on a collar 25. The receiver tube 24 is designed to be open on its free end 33.

A check valve 34 is arranged in the passage 7 in order to prevent backflow of lubricant into the plunger receptacle 3 when the plunger pump 10 downstream of the passage 7 is actuated.

The lubricant press 1 forms a lubricant press set 26 in combination with the replaceable cartridge 4.

The filling volume 5 is provided inside the cartridge sleeve 27 and filled with lubricant. The follower piston 13 is movably inserted into the cartridge sleeve 27 as described and moves towards the closing wall 6 when lubricant is being removed, until it is in planar contact with partial area 16.

FIG. 2 shows that the shape of the follower piston 13 is matched to the cartridge 4, so that the filling volume 5 of the cartridge sleeve 27 can be fully emptied without residue by the follower piston 13.

The filling volume 5 of the cartridge sleeve 27 is limited by a removal opening 28, which forms a constriction inside the cartridge sleeve 27. The removal opening 28 is closed prior to first use.

The outer diameter of the top side 15 of the follower piston 13 is matched to the inner diameter of the removal opening 28 to match the shapes, meaning that in this case they are the same size. Further, the height 29 of the shoulder 21 is matched to a projection 30 of the cartridge sleeve 4 beyond the removal opening 28, meaning that in this case they are the same size, apart from the height of the seal 35. Finally, the shoulder surface 31 is matched to a ring-shaped inner surface 32, meaning that they are the same size in this case, with this inner surface 32 being provided on a shroud 36 projecting inward between the removal opening 28 and the cartridge sleeve 31.

The follower piston 13 without interruptions is unloaded and unconnected with the press head 2 and can thus be arranged inside the cartridge sleeve 27 in such a way that it is removable. The follower piston 13 is therefore sucked purely by the lubricant and does not exert pressure itself.

In use, the cartridge 4 is thus opened on the top side and the follower piston 13 is inserted into the cartridge 4 on the underside. This causes the filling volume 5 in the cartridge 4 to be closed. After complete emptying of the cartridge 4, the follower piston 13 is in planar contact with the partial area 16 of the closing wall 6 on its top side 15.

For a lubricant press 1, it is thus proposed to match a follower piston 13 that can be inserted into a cartridge 4 and a closing wall 6 of a cartridge receptacle 3 to one another and to a cartridge 4 in such a manner that the follower piston 13 inside the used up cartridge 4 is in planar contact with the closing wall 6.

LIST OF REFERENCE SIGNS

1. Lubricant press
2. Press head
3. Cartridge receptacle
4. Cartridge
5. Filling volume
6. Closing wall
7. Passages
8. High-pressure chamber
9. Pressing plunger
10. Plunger pump
11. Hand lever
12. Outlet opening
13. Follower piston
14. Open end
15. Top side
16. Partial area
17. Inlet opening
18. Position
19. Cartridge insertion direction
20. Dead volume
21. Shoulder
22. Sealing lip
23. Internal thread
24. Receiver tube
25. Collar
26. Lubricant press set
27. Cartridge sleeve
28. Removal opening
29. Height
30. Projection
31. Shoulder surface
32. Inner surface
33. End
34. Check valve
35. Seal
36. Shroud
37. Ring slot

The invention claimed is:

1. A lubricant press set (26), comprising:
a lubricant press (1) and a cartridge (4), the lubricant press including a press head (2) with a cartridge receptacle (3), the cartridge receptacle (3) having a closing wall (6) in which a passage (7) leads to a high-pressure chamber (8), a pressing plunger (9) movably arranged in the high-pressure chamber (8), the pressing plunger (9) is in operative connection with a hand lever (11) mounted on the press head (2) and the high-pressure chamber (8) leads to an outlet opening (12);
a follower piston (13) inserted into the cartridge (4);
the cartridge (4) includes a cartridge sleeve (27) surrounding a filling volume (5), and the follower piston (13) being movably inserted in the cartridge sleeve (27) to seal off the filling volume (5), a shape of the follower piston (13) is matched to the cartridge (4) such that the filling volume (5) is adapted to be emptied without leaving any residue;
the follower piston (13) having a top side (15) that faces the closing wall (6) in an operating position, the top side has a contour that matches a contour of the closing wall (6) and the follower piston (13) includes a circumferential shoulder (21) around the top side (15), and the top side (15) of the follower piston (13) extends through a removal opening (28) of the cartridge (4) and is in planar contact with the closing wall (6) at least in a partial area (16) when a content of the cartridge (4) is used up.

2. The lubricant press set (26) according to claim 1, wherein an inlet opening (17) of the passage (7) in a cartridge insertion direction (19) defined by the cartridge receptacle (3) is arranged at a position (18) on the closing wall (6) furthest inside the press head (2).

3. The lubricant press set (26) according to claim 1, wherein the follower piston (13) is formed without interruptions.

4. The lubricant press set (26) according to claim 1, further comprising an internal thread (23) provided on the cartridge receptacle (3).

5. The lubricant press set (26) according to claim 1, further comprising a check valve (34) provided inside the passage (7).

6. The lubricant press set (26) according to claim 1, wherein the filling volume (5) of the cartridge sleeve (27) is limited by a constricting removal opening (28) and an outer diameter of the top side (15) of the following piston (13) is matched to an inner diameter of the removal opening (28).

7. The lubricant press set (26) according to claim 6, wherein a height (29) of a shoulder (21) surrounding the top side (15) of the follower piston (13) is matched to a projection (30) of the cartridge sleeve (27) beyond the removal opening (28).

8. The lubricant press set (26) according to claim 7, wherein a ring-shaped shoulder surface (31) of a shoulder (21) surrounding the top side (15) is matched to a ring-shaped inner surface (32) located between the removal opening (28) and the cartridge sleeve (27).

9. The lubricant press set (26) according to claim 1, wherein the follower piston (13) is at least one of unloaded by or unconnected with the press head (2).

10. The lubricant press set (26) according to claim 1, wherein at least one of the closing wall (6) is planar at least in the partial area (16) or the top side (15) is planar.

11. The lubricant press set (26) according to claim 1, wherein the shoulder (21) has a ring-shaped shoulder surface (31) that is parallel to the top side (15).

12. The lubricant press set (26) according to claim 1, wherein the follower piston (13) comprises a circumferential sealing lip (22).

13. The lubricant press set (26) according to claim 1, wherein a receiver tube (24) is screwed into the cartridge receptacle (3), and the receiver tube (24) is open on a free end (33) thereof.

14. The lubricant press set (26) according to claim 1, further comprising a plunger pump (10) downstream of the passage (7).

15. The lubricant press set (26) according to claim 1, wherein the follower piston (13) is located inside the cartridge sleeve (27) in a removable manner.

16. A method of dispensing lubricant from a cartridge (4) with a lubricant press set (26), comprising:
- providing the lubricant press including a press head (2) with a cartridge receptacle (3), the cartridge receptacle (3) having a closing wall (6) in which a passage (7) leads to a high-pressure chamber (8), a pressing plunger (9) movably arranged in the high-pressure chamber (8), the pressing plunger (9) is in operative connection with a hand lever (11) mounted on the press head (2) and the highpressure chamber (8) leads to an outlet opening (12);
- providing a follower piston (13) having a shape that matches the cartridge (4) and having a top side (15) that faces the closing wall (6) in an operating position, and the top side has a contour that matches a contour of the closing wall (6), and the follower piston (13) includes a circumferential shoulder (21) around the top side (15;
- providing the cartridge (4) including a cartridge sleeve (27) surrounding a filling volume (5) filled with lubricant;
- opening the cartridge (4) at the top and that prior to removal of the lubricant from the cartridge (4);
- inserting the follower piston (13) into the cartridge (4) on an underside in order to close a filling volume inside the cartridge;
- operating the hand lever in order to dispense the lubricant; and
- after complete emptying of the lubricant from the cartridge (4), the top side (15) of the follower piston (4) extends through a removal opening (28) of the cartridge (4) and is in planar contact with a partial area (16) of the closing wall.

* * * * *